United States Patent [19]

Behrman

[11] 4,094,779

[45] June 13, 1978

[54] WATER PURIFICATION MEANS AND METHOD

[76] Inventor: Abraham S. Behrman, 240 E. Delaware Pl., Chicago, Ill. 60611

[21] Appl. No.: 754,636

[22] Filed: Dec. 27, 1976

[51] Int. Cl.² .......................... C02B 1/14; B01D 23/14
[52] U.S. Cl. ...................................... 210/40; 210/282; 210/474; 210/484
[58] Field of Search ................. 210/40, 282, 474, 502, 210/507, 65, 143, 455, 473, 477, 484, 496

[56] References Cited

U.S. PATENT DOCUMENTS

| 737,116 | 8/1903 | Knight | 210/502 |
|---|---|---|---|
| 1,081,574 | 12/1913 | Boeck | 210/474 |
| 3,497,071 | 2/1970 | Mineo | 210/474 |
| 3,536,197 | 10/1970 | Ward | 210/282 |

Primary Examiner—Charles N. Hart
Assistant Examiner—Ivars Cintins
Attorney, Agent, or Firm—Lockwood, Dewey, Zickert & Alex

[57] ABSTRACT

A novel filtration system for purifying a relatively small volume of water, and especially for removing objectionable tastes and odors from drinking water. An inverted container of the water to be purified is supported above a filter which in turn is supported above a bottom container for receiving the effluent from the filter. The upper container is provided with an outlet tube which extends into the filter and is provided with means for regulating the flow of water to the filter. The filter holds a disposable filter medium in the form of a thin "sandwich" of two outer sheets of readily permeable material and a thin inner layer of activated carbon particles disposed uniformly between the two outer sheets. In operation, water flows from the upper container through the filter into the bottom container, the rate of flow of water from the upper container being controlled automatically by the level of water in the filter. A simple and inexpensive process for purifying a relatively small volume of water, and which is especially suitable for a one-time use of the disposable filter medium component, is thus provided.

3 Claims, 3 Drawing Figures

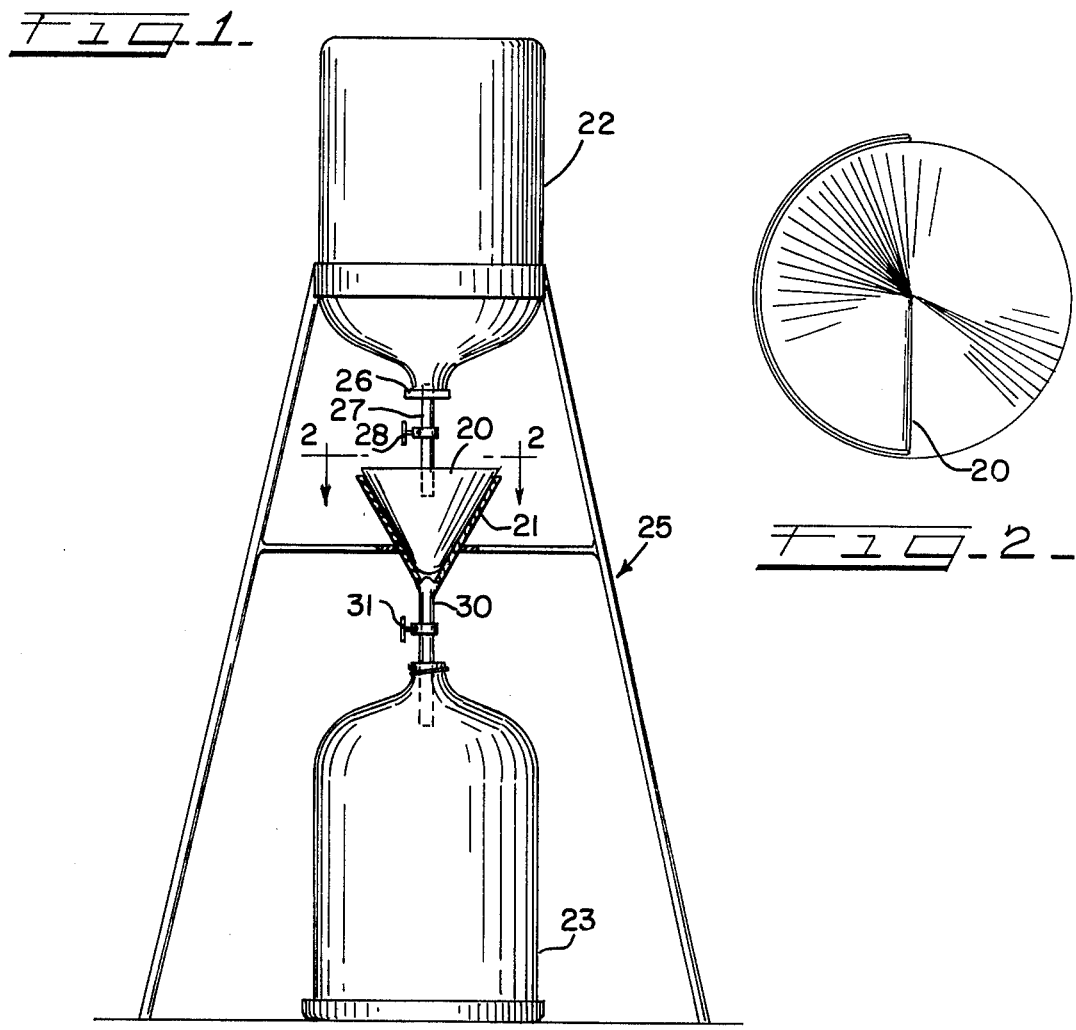
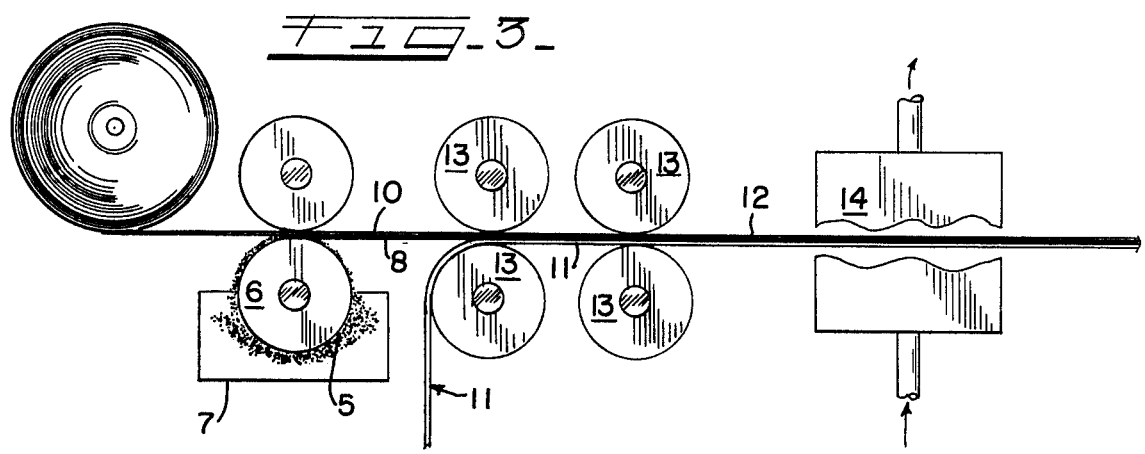

WATER PURIFICATION MEANS AND METHOD

This invention relates to the purification of water. It comprises a new and useful water purification process and apparatus and article of manufacture for carrying out the process.

Much attention has been given, especially in the last few years, to the quality of community water supplies. While the bacteriological quality of these supplies is in general excellent, many of them contain objectionable tastes and odors, and some contain at least trace amounts of chemical substances which may be hazardous to human health.

The most common, and almost universal, source of objectionable taste and odor in water is chlorine. With few exceptions, practically all community water supplies in the United States are disinfected with chlorine, and a small residue of chlorine is purposely left in, or added to, the water as it leaves the water plant and enters the community distribution system. The amount of this "residual chlorine" may be as much as 0.7 to 1.0 parts per million (ppm) as the water leaves the plant, but it usually drops to about 0.5 ppm or less in a distribution system of appreciable size by the time the water reaches the consumer's tap. The twofold purpose of the residual chlorine is to give evidence that the water has been adequately disinfected, and to provide protection against minor contamination in the distribution system. The absence of residual chlorine in the distribution system is usually cause for investigation and possibly for concern.

Besides chlorine, objectionable tastes and odors may be produced, especially in surface waters, by trace or larger amounts of organic substances—objectionable either in themselves, or in combination with the chlorine used for disinfection. Phenols, for example, are much less objectionable than the chlorophenols produced by their reaction with chlorine; and one of the compounds resulting from chlorination that is currently causing serious concern is chloroform, which has been shown to be carcinogenic in tests with rats.

The agent that has been found most generally effective for removing the several types of objectionable tastes and odors mentioned, as well as certain other kinds of impurities—some of them possibly hazardous to human health—is activated carbon, in either granular or powdered form. Beds of granular carbon, in suitably designed equipment, are extensively used for that purpose in a wide variety of industrial plants, especially in food and beverage plants. Until the last few years, community water treatment plants used powdered activated carbon almost exclusively, in connection with conventional treatment processes. The development of improved and practical methods for regenerating spent granular carbon, and the availability of attractive servicing and leasing plans, have led to renewed interest in and use of granular carbon in community treatment plants.

The taste and odor due to residual chlorine, and/or the chlorinated compounds that may have been formed by chlorination of the water, are as objectionable in the home as they are in the industries mentioned since, besides making the water itself unpalatable to drink, they make it difficult or impossible to prepare good-tasting coffee, other beverages, and many foods.

For removing residual chlorine and other objectionable taste and odors from water in the home, a number of small filter devices, typically employing small beds or pads of granular activated carbon, have appeared on the market. The typical device of this kind is connected into the cold water line in the kitchen or bathroom and is provided with a separate faucet for drawing off the water that has been filtered through the carbon.

Aside from the effort and expense of installing devices of this sort, there is a much more serious objection to them, that is, that the carbon bed can unfortunately become an excellent breeding ground for the growth of bacteria and certain other organic substances. As a result, after a short initial period of use, the water leaving the filter may contain many more bacteria and much more other organic matter than the water entering it. In the case of a large, commercial activated carbon filter, frequent backwashing of the filter helps to prevent or delay the development of this contaminated condition and, if and when the condition does occur, methods have been devised, usually employing steam, hot water, or chemicals, to sterilize the carbon bed and restore it to its non-contaminated condition. It is obvious that none of these methods of sterilization is available or practical in the case of the typical small household filter connected to the cold water line.

The importance of this factor can be appreciated from the fact that the purification capacity of a typical commercial activated carbon filter, especially for removing chlorine, is so relatively enormous that the carbon bed remains effective for at least a year or two before it needs replacement. It is easy to find the explanation for this extremely long active life, especially when residual chlorine is the principal or only impurity removed by the carbon.

When chlorine is dissolved in water, it forms hydrochloric acid (HCl) and hypochlorous acid (HClO):

And, when this water is passed through an activated carbon filter, the hypochlorous acid reacts with the carbon, forming more hydrochloric acid and carbon dioxide:

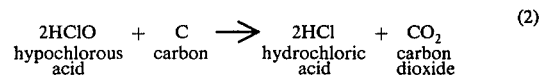

Multiplying equation (1) by 2, and adding the resulting equation to equation (2):

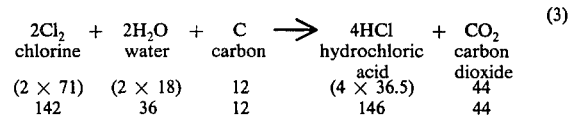

The last line of figures above shows the relative weights of chlorine, water and carbon taking part in the reaction. From these figures it is evident that if the carbon (atomic weight 12) is 100 percent pure and completely reactive (probably never quite true in either case), 12 grams of carbon will react with 142 grams of chlorine (molecular weight 71), practically 12 times its own weight. If we assume further that the typical community water supply contains at the tap 0.5 parts per million, or 0.5 milligrams per liter, of residual chlorine, then one gram (1,000 milligrams) of our theoretically pure and completely reactive carbon can react with the 12 grams (12,000 milligrams) of chlorine contained in 24,000 liters (a little more than 6,000 gallons) of that water--enough to supply a typical family of four with its water for drinking and cooking for about four years. Since the typical household activated carbon filter usually contains much more than one gram of carbon, the volume of water from which the 0.5 parts per million of chlorine may be removed is really enormous.

The minute amount of hydrochloric acid formed in the reaction between the 0.5 parts per million of chlorine and the activated carbon is negligible and it is immediately neutralized by the alkalinity always present in community water supplies and practically all natural waters.

The practical point of the above calculation is that the activated carbon in a typical small household filter can become badly contaminated with bacteria and other organic growths long before its ability to remove chlorine is exhausted; the filter thus may contaminate, instead of purifying, the water passing through it.

Many organic and inorganic compounds which do not react chemically with activated carbon are adsorbed by it. These compounds include not only those whose presence is evident because they produce color or objectionable taste and/or odor, but also those that may be present in a water that is perfectly clear, colorless, and free from objectionable taste and/or odor. While some of these compounds may be present in only minute or even trace amounts, the toxicity of some of them is great enough to cause concern.

It is the basic objective of the present invention to utilize the advantages of activated carbon in water treatment while avoiding the disadvantages noted above. This objective is accomplished by treating a relatively small volume of water with a novel, inexpensive and disposable carbon-containing filter medium which is designed specifically to permit discarding it after a single use, and to perform the treatment in a novel, simple, and automatic manner.

A principal object of the invention is a batch process for removing objectionable tastes and odors from a confined and relatively small volume of water, especially drinking water.

Another principal object of the invention is a batch process for purifying relatively small volumes of water automatically and economically.

Another object of the invention is a batch process for removing potentially hazardous organic compounds from a confined and relatively small volume of drinking water.

A further object of the invention is an improved filter system for carrying out the processes of the invention.

For a more complete understanding of the nature and scope of the invention reference may now be had to the following detailed description of preferred embodiments thereof and the accompanying drawings, wherein:

FIG. 1 is an elevational view, partly in vertical section, of a purifying filtration apparatus forming a presently preferred embodiment of the invention;

FIG. 2 is a detail plan view on enlarged scale taken on line 2—2 of FIG. 1; and

FIG. 3 is a diagrammatic view of an apparatus for producing the sandwich type filter medium used in accordance with the invention.

The novel and disposable carbon-containing filter medium used in the filter consists essentially of a thin "sandwich" of two outer thin sheets of an inert, readily permeable material and a thin inner layer of activated carbon particles disposed uniformly between the two outer sheets.

This "sandwich" filter medium may be formed in any suitable manner. Using the apparatus shown in FIG. 3 in the drawings, powdered activated carbon is mixed with water and a water-soluble or water-insoluble binder adhesive to form a fluid paste 5, and, by means of a feed roll 6 passing through a container 7 of the paste, continuously depositing a coating 8 of the paste on the under surface of a moving strip 10 of one of the outer sheets of permeable material. The other outer sheet 11 is then applied continuously and synchronously under the moving coated one. The "sandwich" 12 thus formed passes through compressing rolls 13—13 to a drying chamber 14. The web leaving the dryer 14 may be wound up in a roll form. Alternately the web may be formed into special shapes before or after drying.

The method of forming the "sandwich" filter medium 12 may be varied in many ways, both as to materials and as to details of processing. The outer sheets 10 and 11 may be composed of any readily permeable water-insoluble material capable of holding back the particles of activated carbon and preventing their escape into the water being treated. I have found satisfactory for this purpose, loosely woven filter paper or cloth, paper towelling, porous plastic, etc. Scott brand towelling has been used. Whatman #1 filter paper available from B & R Balston, Ltd., England and qualitative filter such as Fisher Brand, coarse porosity (crimped) filters (200 ml/min./in.$^2$ with 2 inches head) available from Fisher Scientific Co., may also be used.

There is also a wide choice of materials serving as a binder and adhesive in forming the paste 5. Among those that may be used are starch, sodium carboxymethyl cellulose (CMC), water-soluble or water-insoluble resins, mixtures thereof, etc. Ther choice of a water-soluble or water-insoluble binder will depend on the type of filter medium desired. The advantage of a water-soluble binder is that it quickly escapes with the first flow of water through the filter, thus freeing additional surface of the activated carbon particles. The obvious disadvantage of a water-soluble binder is that the first volume of effluent will contain the binder, the ingestion of which in some cases may not be desirable, in which event the initial small volume of effluent should be discarded.

Instead of aqueous mixtures of activated carbon, adhesive binder and water, I may use mixtures of nonaqueous solvents miscible with other binding materials. Alternatively, I may utilize as a binder a known pressure-sensitive or thermoplastic adhesive thereby avoiding the need for a final drying step. In using a thermoplastic resin adhesive as the binder, as in so-called "hot melt" operations, the operation is conducted at a temperature high enough to effect sufficient fluidity in the mixture, but below a temperature that would injure the outer permeable layers of the "sandwich".

Still another method of forming the "sandwich" filter medium, which I consider somewhat less desirable than those already mentioned, is to brush or spray a thin layer of finely powdered activated carbon, without a binding material, on the upper surface of one continuously moving outer layer, and subsequently lay down the other outer layer in the manner previously described.

The "sandwich" filter medium may be formed into any desired size and shape. For purposes of illustration, it is shown in the drawing as a folded filter disc 20 such as in common use with glass funnels in chemical laboratories. Other shapes may also be used to conform to the design of the apparatus in which it is to be employed. For example, the filter medium may be pre-formed with fluted sides and nested in various quantities in the same manner that paper filters for automatic electric coffee makers are preformed and nested. The general objective is to provide maximum filter surface consistent with that type of apparatus so as to permit maximum flow of water through the filter.

The following two examples of aqueous mixtures of adhesive binder and activated carbon which may be utilized in the process of forming the "sandwich" filter medium 12 as shown in FIG. 3 of the drawing are given by way of illustration and without limitation:

EXAMPLE 1

| Powdered activated carbon - "Darco" "S-51" | 10.0 | parts by weight |
|---|---|---|
| Powdered corn starch - "Argo" - food grade | 4.0 | " |
| Water | 100.0 | " |

"Darco" activated carbon is a product of ICI, United States. "Argo" corn starch is a product of Best Foods, a division of CPC International, Inc.

The starch is mixed with about 12 to 15 parts of the water (cold) to form a thin slurry; this is then added with vigorous stirring to the remainder of the water which has been heated to boiling. Almost immediately a translucent paste is formed, embracing the entire volume of the mixture. The activated carbon is then added gradually, with continued stirring, until the carbon is distributed uniformly throughout the mixture which now has a fluidity suitable for use with the feed roll shown in FIG. 3.

EXAMPLE 2

| Powdered activated carbon - "Nuchar" | 20.0 | parts by weight |
|---|---|---|
| Sodium carboxymethyl cellulose - (CMC) | 2.0 | " |
| Water | 100.0 | " |

"Nuchar" activated carbon is a product of Westvaco Corporation. CMC used is a product of Hercules, Inc.

The activated carbon and CMC are thoroughly mixed in the dry state. This mixture is added to the water at room temperature and stirred vigorously for several minutes until the swelling of CMC produces a paste with sufficient fluidity for use with the feed roll 6 (FIG. 3).

Referring now to FIG. 1, this shows one arrangement for readily carrying out my invention in the home or field or elsewhere. Upper container 22 and lower container 23 are readily available half-gallon wide-mouth bottles, with bayonet-type metal closures, and widely used for fruit juices. Container 22 rests in and is supported by the inwardly dished top band 24 of the stand indicated generally at 25. For convenience in carrying or in the field, stand 25 may be made foldable or collapsible, using well-known expedients for accomplishing such construction. Container 22 is provided with a removable closure 26 from which extends outlet tube 27 which is provided with a quick-opening valve 28. Outlet tube 27 extends down into and below the top of funnel 21 which has an outlet tube 30 provided with controlling means 31 that extends down to or just below the top of lower container 23. Funnel 21 may be ribbed or provided with other means for minimizing contact of the outer surface of the disposable filter medium 20 with the inner surface of the funnel 21.

It will be obvious that other suitable types of containers may be employed in place of those shown in the drawing for purposes of example.

In practice, empty container 22 is filled not quite full with the water to be treated, leaving at least about a half inch air space below closure 26 on filling. Closure 26 with the outlet tube 27 attached is tightened in place and then the container is inverted and put in place on stand 25. The apparatus is now ready fo use and the valve 28 is opened, allowing air to enter and pass upwardly into container 22. As a result, water begins to flow from container 22 into the filter funnel 21 and will rise in it until its level is above the bottom of outlet tube 27, thus shutting off the ingress of air into container 22 and stopping the flow of water from it.

Flow of water through the filter element 20 may be regulated as desired by adjusting the valve 31. In most cases no restriction of flow is necessary beyond that provided by the filter medium itself. If, however, taste or chemical tests show that removal has not been complete, reducing the rate of flow may be indicated. An alternative procedure is to put the same water through the filter more than once.

Ordinarily, the disposable filter medium 20 of my invention should not be used more than once or twice, and only on one day. To do otherwise can defeat a basic objective of the invention which is to prevent the self-contamination of the activated carbon previously mentioned. The low cost of the disposable filter medium 20 makes a single use of it entirely practical and economical.

The filter system of my invention is designed specifically for removing objectionable tastes and odors and incidentally minute amounts of some types of organic and inorganic matter from drinking water. It is not designed to disinfect water contaminated with pathogenic bacteria or other organisms, and no claim or intimation of claim of disinfection is made. For emergency disinfection in the field, water suspected of being biologically contaminated may be disinfected in known manner by adding to the water an effective excess of chlorine in the form of sodium hypochorite from a commercial bleaching solution and, after a prescribed length of time, removing residual chlorine by means of the filter system of my invention; but this procedure of "super chlorination" and "dechlorination", as it is known in the water purification art, should be practiced only by a person with a thorough understanding of the procedure, with the knowledge and materials for making and interpreting the appropriate tests, and who will assume responsibility for the results.

Nor is the filter system of my invention designed to clarify a turbid water or a highly colored one (the color being due most often to dissolved organic matter), although some degree of clarification and removal of color (and of some other organic and inorganic impurities) may be accomplished; generally speaking, neither a turbid water nor a highly colored one is suitable for drinking and must be given specific treatment to remove the turbidity or color as is done routinely in conventional filter plants.

I claim:

1. A process for removing objectionable tastes and odors from a relatively small volume of water at an automatically controlled rate of flow which comprises allowing the water to flow by gravity from an inverted upper container closed except for an outlet opening and superimposed above and discharging into and below the top of a filter which in turn is superimposed above a filtrate-receiving container, said filter holding a disposable activated carboncontaining filter medium, the rate of flow of the water from the upper container to the filter being controlled automatically by the level of water in the filter with air entering said container exclusively through said outlet opening to replace water emptying through said outlet opening.

2. Apparatus for removing by filtration objectionable tastes and odors from a relatively small volume of water, comprising an upright first container for receiving the filtered water, a filter funnel supported on or above said upright container and discharging thereinto, a disposable filter element containing activated carbon inserted in said funnel, an inverted second container for water to be filtered mounted above said filter funnel with the discharge outlet from said inverted container disposed in and below the top of said funnel and said filter element therein, said second container being closed to entrance of air except through said discharge outlet.

3. The apparatus of claim 2 wherein said filter element is formed from a sheet having two outer webs of water-permeable material with a layer of activated carbon particles therebetween.

* * * * *